(12) United States Patent
Haumont et al.

(10) Patent No.: US 11,810,146 B2
(45) Date of Patent: Nov. 7, 2023

(54) METHOD AND APPARATUS FOR SOFT LIMITS FOR ADVERTISEMENT SERVING

(71) Applicant: HERE Global B.V., Eindhoven (NL)

(72) Inventors: Serge Rene Haumont, Helsinki (FI); Kimmo A. Kangas, Kerava (FI); Kevin Fallis, Plympton, MA (US)

(73) Assignee: HERE Global B.V., Eindhoven (NL)

( * ) Notice: Subject to any disclaimer, the term of this patent is extended or adjusted under 35 U.S.C. 154(b) by 347 days.

(21) Appl. No.: 15/930,187

(22) Filed: May 12, 2020

(65) Prior Publication Data
US 2020/0273061 A1    Aug. 27, 2020

Related U.S. Application Data

(63) Continuation of application No. 12/732,506, filed on Mar. 26, 2010, now abandoned.

(51) Int. Cl.
*G06Q 30/0241* (2023.01)
*G06Q 30/02* (2023.01)

(52) U.S. Cl.
CPC ......... *G06Q 30/0241* (2013.01); *G06Q 30/02* (2013.01)

(58) Field of Classification Search
None
See application file for complete search history.

(56) References Cited

U.S. PATENT DOCUMENTS

| | | | |
|---|---|---|---|
| 5,611,051 A | 3/1997 | Pirelli | |
| 2003/0126232 A1* | 7/2003 | Mogul | G06F 16/9574 709/219 |
| 2005/0144642 A1* | 6/2005 | Ratterman | H04N 21/4882 348/E7.071 |
| 2005/0245241 A1* | 11/2005 | Durand | H04L 65/1101 455/414.1 |
| 2006/0025169 A1 | 2/2006 | Maciocco et al. | |

(Continued)

FOREIGN PATENT DOCUMENTS

| KR | 2001-0066750 A | 7/2001 |
|---|---|---|
| KR | 10-2009-0070644 A | 7/2009 |

(Continued)

OTHER PUBLICATIONS

Chen et al. ("Instant Advertising in Mobile Peer-to-Peer Networks," 2009 IEEE 25th International Conference on Data Engineering, 2009, pp. 736-747, doi: 10.1109/ICDE.2009.14) (Year: 2009).*

(Continued)

*Primary Examiner* — Christopher B Tokarczyk
(74) *Attorney, Agent, or Firm* — DITTHAVONG, STEINER & MLOTKOWSKI

(57) ABSTRACT

An approach is provided for caching advertisements on a device according to soft limits. Caching of an advertisement is caused, at least in part at the device. A soft limit is determined to be associated with and advertisement. The soft limit specifies when to cache one or more other advertisements. Presentation of the advertisement, the other advertisements, or a combination thereof is caused, at least in part, based on validity information associated with the advertisement.

20 Claims, 9 Drawing Sheets

(56) References Cited

U.S. PATENT DOCUMENTS

| | | |
|---|---|---|
| 2006/0294258 A1* | 12/2006 | Powers-Boyle ....... G06Q 30/02 |
| | | 705/1.1 |
| 2007/0060099 A1 | 3/2007 | Ramer et al. |
| 2007/0174490 A1 | 7/2007 | Choi et al. |
| 2007/0179852 A1 | 8/2007 | Martin et al. |
| 2008/0215437 A1 | 9/2008 | Levy et al. |
| 2008/0311843 A1 | 12/2008 | Freij et al. |
| 2009/0006177 A1 | 1/2009 | Beaver et al. |
| 2009/0098914 A1* | 4/2009 | Martin-Cocher ........................... |
| | | H04W 52/0264 |
| | | 307/130 |
| 2010/0082397 A1 | 4/2010 | Blegen |
| 2011/0029670 A1* | 2/2011 | Klein ...................... H04L 67/52 |
| | | 709/224 |
| 2013/0232008 A1* | 9/2013 | Macaluso ............... H04W 4/24 |
| | | 705/14.64 |

FOREIGN PATENT DOCUMENTS

| | | |
|---|---|---|
| KR | 10-2009-0079442 A | 7/2009 |
| WO | 01/42961 A2 | 6/2001 |
| WO | 01/43374 A1 | 6/2001 |

OTHER PUBLICATIONS

Goncalves et al., "Using Common Lisp to Prototype Offline Work in Web Applications for Rich Domains", European Conference on Object-Oriented Programming, Proceedngs of the 6th European Lisp Workshop, Genova, Italy, 2009, pp. 18-27.

\* cited by examiner

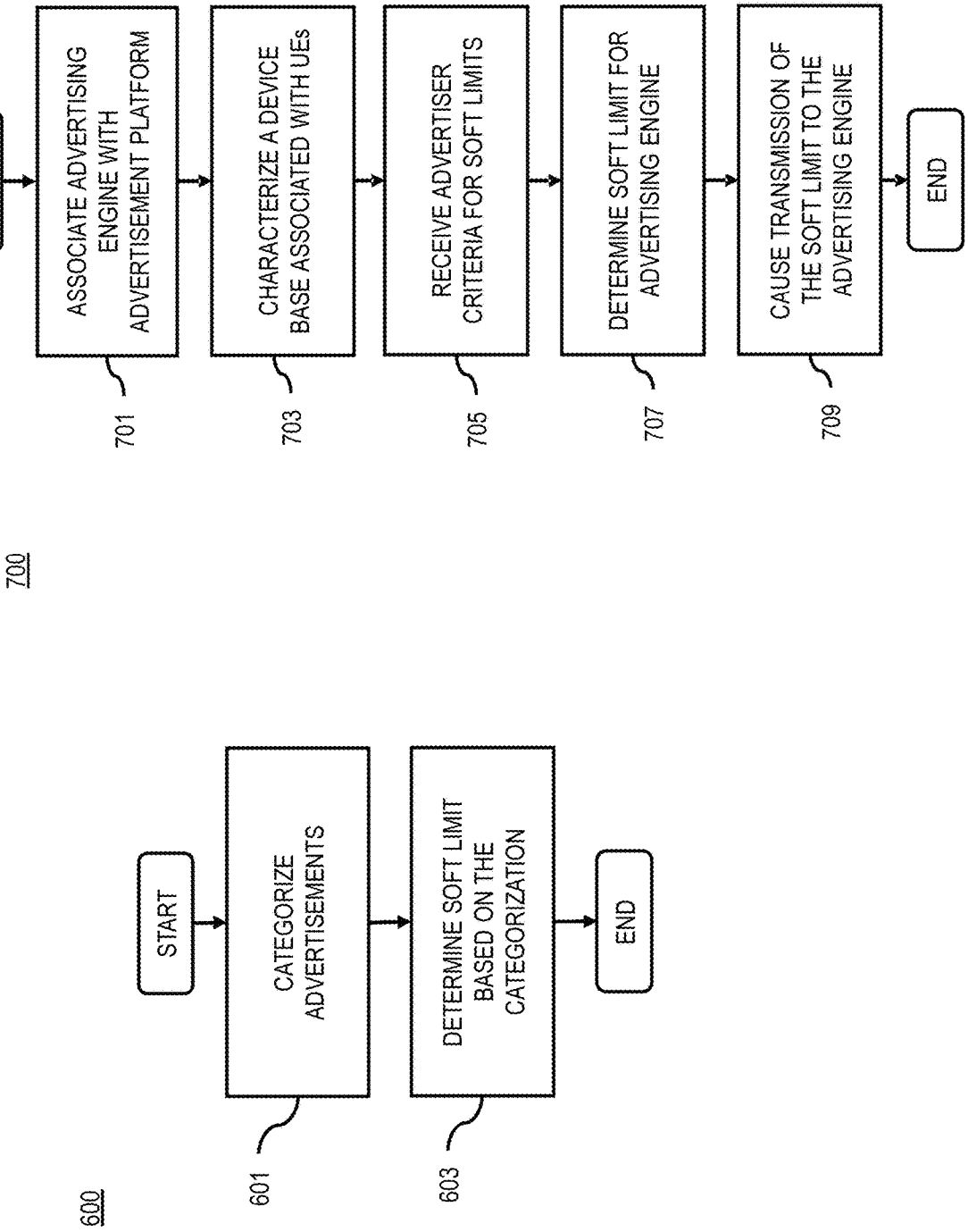

METHOD AND APPARATUS FOR SOFT LIMITS FOR ADVERTISEMENT SERVING

CROSS REFERENCE TO RELATED APPLICATION

This application is a continuation of U.S. application Ser. No. 12/732,506, filed Mar. 26, 2010, entitled "Method and Apparatus for Soft Limits for Advertising Serving," the entirety of which is incorporated herein by reference.

BACKGROUND

Service providers and device manufacturers (e.g., wireless, cellular, etc.) are continually challenged to deliver value and convenience to consumers by, for example, providing compelling network services. These network services may generate revenue for the network services by presenting advertisements to users of the services. Examples of network services include messaging services, maps and navigation services, social networking services, media services, purchasing services, gaming services, and the like. Advertisements can be positioned in the same screen as an active service presented to a user and/or as in a separate view before, after, or during the use of the service. Although advertisements used in conjunction with these services have become increasingly popular, device manufacturers and service providers face significant technical challenges to increasing the effectiveness of advertisements while balancing the effectiveness with device capabilities and user experience. For example, it may be ineffective to present a single ad to a user for weeks or months at a time.

SOME EXAMPLE EMBODIMENTS

Therefore, there is a need for an approach for utilizing soft limits for advertisement serving. In certain embodiments, a soft limit is a limit (e.g., a time since the advertisement was loaded to a cache of a device or number of impressions the advertisement has been shown) that triggers a request to fetch additional advertisements from a server, but does not make invalid the advertisement stored in the cache that corresponds to the soft limit.

According to one embodiment, a method comprises causing, at least in part, caching of an advertisement at a device. The method also comprises determining a soft limit associated with the advertisement. The soft limit specifies when to request one or more other advertisements to be downloaded to the cache. The method further comprises causing, at least in part, the presentation of the advertisement, the other advertisements, or a combination thereof based on validity information associated with the advertisement. A different soft limit may be associated to each advertisement, or a different soft limit may be associated to each advertisement category (e.g. sponsorship, guaranteed, remnant, house), or one soft limit may be used for all ads in cache.

According to another embodiment, an apparatus comprising at least one processor, and at least one memory including computer program code, the at least one memory and the computer program code configured to, with the at least one processor, cause, at least in part, the apparatus to cause, at least in part, caching of an advertisement at a device. The apparatus is also caused to determine a soft limit associated with the advertisement. The soft limit specifies when to request one or more other advertisements to be downloaded to the cache. The apparatus further causes, at least in part, the presentation of the advertisement, the other advertisements, or a combination thereof based on validity information associated with the advertisement.

According to another embodiment, a computer-readable storage medium carrying one or more sequences of one or more instructions which, when executed by one or more processors, cause, at least in part, an apparatus to cause, at least in part, caching of an advertisement at a device. The apparatus is also caused to determine a soft limit associated with the advertisement. The soft limit specifies when to request one or more other advertisements to be downloaded to the cache. The apparatus further causes, at least in part, the presentation of the advertisement, the other advertisements, or a combination thereof based on validity information associated with the advertisement.

According to another embodiment, an apparatus comprises means for causing, at least in part, caching of an advertisement at a device. The apparatus also comprises means for determining a soft limit associated with the advertisement. The soft limit specifies when to request one or more other advertisements to be downloaded to the cache. The apparatus further comprises means for causing, at least in part, the presentation of the advertisement, the other advertisements, or a combination thereof based on validity information associated with the advertisement.

According to one embodiment, a method comprises determining a soft limit associated with an advertisement. The method also comprises causing, at least in part, transmission of the advertisement and associated soft limit to a device. The soft limit specifies when to request one or more other advertisements to be downloaded.

According to another embodiment, an apparatus comprising at least one processor, and at least one memory including computer program code, the at least one memory and the computer program code configured to, with the at least one processor, cause, at least in part, the apparatus to determine a soft limit associated with an advertisement. The apparatus is also caused to cause, at least in part, transmission of the advertisement and associated soft limit to a device. The soft limit specifies when to request one or more other advertisements to be downloaded.

According to another embodiment, a computer-readable storage medium carrying one or more sequences of one or more instructions which, when executed by one or more processors, cause, at least in part, an apparatus to determine a soft limit associated with an advertisement. The apparatus is also caused to cause, at least in part, transmission of the advertisement and associated soft limit to a device. The soft limit specifies when to request one or more other advertisements to be downloaded.

According to another embodiment, an apparatus comprises means for determining a soft limit associated with an advertisement. The apparatus also comprises means for causing, at least in part, transmission of the advertisement and associated soft limit to a device. The soft limit specifies when to request one or more other advertisements to be downloaded.

According to another embodiment, an advertising platform or ad server comprising means for delivering ads to an ad engine, means for determining a soft limit associated with the advertisement stored in cache, wherein the soft limit specifies when to request one or more other advertisements to be downloaded to the cache, and means for transferring that soft limit to the ad engine.

According to another embodiment, an advertising engine comprising means for receiving advertisements and means for enforcing a soft limit associated with the advertisement. The soft limit specifies when to request one or more other advertisements to be downloaded to the cache. The advertising engine further comprises means to serve advertisements previously stored in cache after a soft limit is reached. The advertising engine further comprises means to determine said soft limit from its default configuration, or from contextual information, or from information received from an advertising platform or service platform.

According to yet another embodiment, a method wherein advertisements are stored in a cache and may be served multiple times from the cache. The method comprises determining at least one soft limit associated with the advertisements stored in cache, wherein the soft limit specifies when to request one or more other advertisements to be downloaded to the cache. The method further comprises that the advertisements previously stored in cache are not deleted and may still be served after a soft limit is reached.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. For example, the ad engine may be implemented as part of a mobile device or part of a proxy (e.g., proxy browser) in a network. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 6 is a flowchart of a process for determining soft limits based on categories, according to one embodiment;

FIG. 7 is a flowchart of a process for determining soft limits based on advertiser criteria, according to one embodiment;

DESCRIPTION OF SOME EMBODIMENTS

Examples of a method, apparatus, and computer program for serving advertisements according to soft limits are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
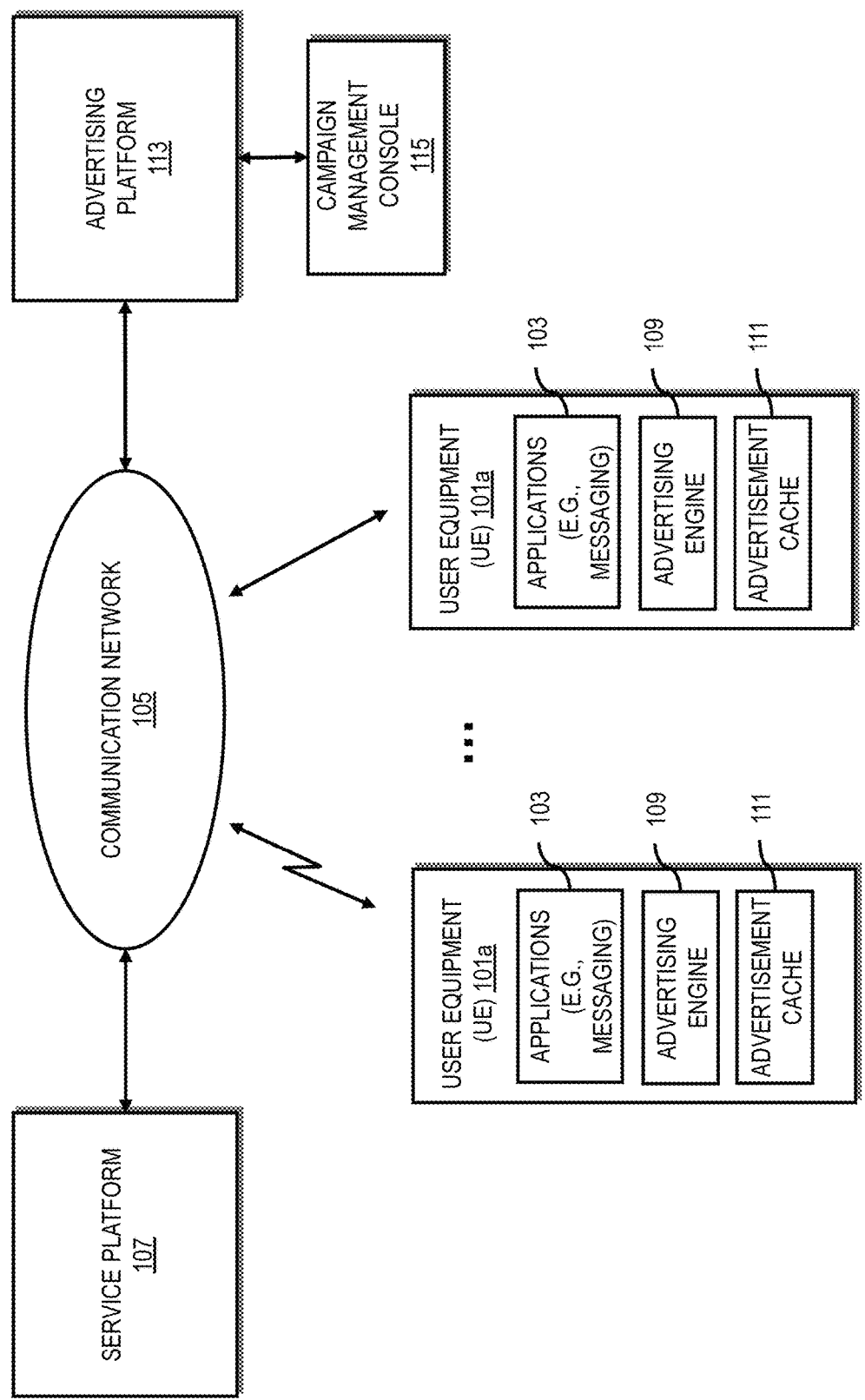
FIG. 1 is a diagram of a system capable of serving advertisements to a user using soft limits, according to one embodiment.

FIG. 1 is a diagram of a system capable of serving advertisements to a user using soft limits, according to one embodiment. As noted previously, service providers and device manufacturers may generate revenue or otherwise promote additional services, features, products, etc. by presenting advertisements on user devices. Advertisements generally may be presented in association with various applications and/or services such as messaging, navigation, maps, social networking, media (e.g., video, audio, images, etc.), games, stores, etc. For example, a messaging application may display, in a portion of a graphical user interface, the advertisement in parallel with presenting the messaging features. The advertisements can be stored in a cache or memory of a device executing applications to allow the device to quickly and conveniently provide the advertisements to users with almost no delays (e.g., 100 ms) and serve advertisements consistently on-line and off-line.

Advertising engines can retrieve advertisements from such caches to present advertisements with one or more applications. In certain embodiments, an advertising engine is a program and/or hardware resident on a device that can retrieve advertisements from an advertising server and control presentation of the advertisements. The advertising engine can fetch advertisements from an advertising server via an Application Programming Interface (API) to store in the cache for presentation via, for instance, the applications. By caching advertisements, the advertising engine can quickly deliver advertisements to the applications while the device running the application is on-line, and then can present the advertisements at any later time whether the device is on-line or off-line. Further, caching advertisements allows for optimizations of device usage because the device need not request an advertisement from the advertising server each time an advertisement is needed. Thus, communications costs (e.g., cellular radio, wireless local area network (WLAN), LAN, etc.) are lowered for both the device and the communication network providing advertisements to the device. For example, a wireless provider (e.g., American Telephone and Telegraph®) may offer a flat fee to users for providing data to devices.

However, caching advertisements on the device can lead to various efficiency and/or user experience problems. For example, user may wish to see a variety of advertisements instead of the same advertisements over and over. Further, service providers may want different advertisements to be shown to users because some advertisements may be more effective on a user than others. Additionally, there often is a trade-off between communications costs of retrieving new advertisements and the user experience/advertising effectiveness (e.g., based on the type of radio utilized by the device, the monetary costs of data communications for the user, diversity of advertisements available on the advertising server, the importance of the user to preserve user experience, advertisement revenue maximization, etc.). An option to not fetch any new advertisements while there are valid advertisements in cache would lead to very optimal communications costs (e.g., data communications and/or device battery use), but the user may be presented the same advertisements for an extended period of time (e.g., weeks or even months). In certain embodiments, an advertisement is associated with a validity time (e.g., a particular date and time when the advertisement expires). In addition or alternatively, the advertisement may be limited based on an impression limit (e.g., after the advertisement is shown to the user a predetermined number of times or impressions, the advertisement will no longer shown to the user).

In contrast, an option to fetch advertisements after each impression of the advertisement to the user would allow the advertising engine to consistently serve new advertisements to the user, and provide advertisement diversity to the user. However, this would require additional communications costs, including the transfer of additional data as well as power costs (e.g., for battery operated devices). Historically, determining when to cache advertising information is controlled by "hard limits" that set an advertisement validity time period or a maximum number of impressions of an advertisement to serve. In other words, when the hard limit (e.g., based on a validity time or number of impressions) for an advertisement is reached, the particular advertisement expires and is, for instance, cleared from the cached. When advertisements expire, the advertising engine can then retrieve additional advertisements. However, because fetching of new advertisements may require use of the communication network, the advertising engine may be caused to attempt to fetch advertisements at an inopportune time (e.g., when a battery of the device is low, when the user is roaming, when the user does not have access to a communication network, etc.).

To address this problem, a system 100 of FIG. 1 introduces the capability to provide advertisements to a user utilizing soft limits. In certain embodiments, a "soft limit" is a parameter set to initiate fetching of additional advertisements and storing them in the cache, when the soft limit is met. As with a hard limit, the soft limit can be based, for instance, on a validity time and/or number of impressions. It is contemplated that any other thresholds or criteria (e.g., whether the user has responded to the advertisement, whether the advertised product or service is still available, etc.) can be used as the soft limit. In one embodiment, the system 100 can set a soft limit for a particular advertisement and then begins to monitor progress towards that limit. On reaching the limit (e.g., reaching a specific time or number of impressions), the system 100 initiates caching of additional advertisements at one or more of the user equipment (UEs) 101a-101n. It is noted that in the approach described herein, the soft limit can act independently of the any hard limit that may be set for the same advertisement. A primary difference between the soft limit described herein and the traditional hard limit is that the soft limit serves as a trigger for when the UE 101 should begin fetching and caching additional advertisements, whereas the hard limit triggers when an advertisement should no longer be presented. In other words, even when the soft limit is reached, the corresponding advertisement may still be valid if the hard limit is not reached.

During the period of time between reaching the soft limit and reaching the hard limit, the UE 101 may fetch and cache additional advertisements so that when the hard limit is reach, additional advertisements would be immediately available even if the UE 101 is off-line or cannot otherwise immediately retrieve additional advertisements (e.g., due to network congestion, etc.). In other embodiments, the soft limit enables the system 100 to more finely control how often or in what rotation among other advertisements, a particular advertisement is displayed. For example, after one advertisement is displayed for five impressions to a particular user, the system 100 may begin retrieving other advertisements to rotate with the one initial advertisement so that the user does not become bored of or jaded to the initial advertisement. In this example, the initial advertisement remains valid (e.g., because the hard limit for the advertisement has not yet been reached) and can be mixed with the presentation other advertisements until the initial advertisement is no longer valid.

As previously discussed, UEs 101a-101n may execute applications 103 such as messaging applications, navigation applications, map applications, social networking applications, media applications (e.g., video, audio, images, etc.), game applications, retail purchasing applications, etc. which may enable presentation of advertisements. It is noted that, in certain embodiments, the advertisements may be displayed directly (e.g., as a system process) without associated with an application 103. The approach described herein applies to either situation or any other situation in which advertisement is presented at the UE 101. By way of example, an application 103 is a program that can be executed to perform a task on a UE 101. Some or all of the applications may obtain services (e.g., network services associated with applications 103) via a communication network 105 from a service platform 107. To provide revenue for the application maker, UE maker, communication network provider, etc., the applications 103 or the UE 101 itself can be associated with an advertising engine 109. The advertising engine 109 can present advertisements to the user during the execution of the application 103, before execution of the application 103, after execution of the application, 103, or a combination thereof. The advertising engine 109 can populate an advertisement cache 111 via an advertising platform 113. As such, the advertising engine 109 requests one or more advertisements from the advertising platform 113 and receives one or more advertisements from the advertising platform 113.

Moreover, the advertising engine 109 may utilize the soft limits to determine when to cache advertising content. As described above, in certain embodiments, a soft limit is a parameter set to initiate causing the advertising engine 109 to cache additional advertisements from the advertising platform 113 when the soft limit is met. In certain embodiments, the soft limit is defined in regards to time or a number of impressions of an advertisement presented on the UE 101. The number of impressions is the number of times a particular advertisement or advertisements (e.g., a set of advertisements belonging to a single advertising campaign) is presented on the UE 101. Further, soft limits can be static or dynamic. A dynamic soft limit can change based on one or more soft limit parameters (e.g., contextual information such as availability of other advertisements, availability of advertised products, etc.) that can be utilized to decrease or increase a soft limit. In certain embodiments, the advertising platform 113 sets soft limits that are applicable at the advertising engine 109. In other embodiments, the advertising engine 109 may set the soft limits locally at the UE 101 based on other parameters available at the UE 101 (e.g., contextual parameters associated with the UE 101 executing the advertising engine 109) or a default configuration.

The advertising platform 113 may include advertising content that can be updated via the communication network 105 and/or a campaign management console 115. The campaign management console 115 can be a workstation or other computing device that may be utilized to update the advertising platform 113. Further, the campaign management console 115 may additionally be utilized to enter input to manually adjust soft limits. For example, a campaign manager can set a soft limit based on contextual information, such as advertisement type, advertisement flight, advertisement publisher, roaming status, device radio type utilized, battery status, time, date, location, etc. Use of contextual information is further detailed in the processes of FIG. 5.

In certain embodiments, the application 103 enables the use of the advertising engine 109 and advertisement cache 111 to present advertisements associated with the application 103. As noted above, the application 103 may present the advertisements in a portion of a graphical user interface (GUI) associated with the application 103. Further, the advertising engine 109 may control advertisements provided to and/or presented by the applications 103. As such, the advertising engine 109 can cause, at least in part, presentation of an advertisement based on validity information associated with the advertisement. In some embodiments, the validity information is a hard limit associated with whether or not the advertisement is valid to be presented. Validity information may be set based on when the advertisement expires (e.g., based on a time indicating the validity of the advertising campaign or a number of impressions sometimes referred as a frequency capping limit).

As shown in FIG. 1, the system 100 comprises a UE 101 having connectivity to the service platform 107 and advertising platform 113 via the communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), audio/video player, digital camera/camcorder, positioning device, television receiver, radio broadcast receiver, electronic book device, game device, or any combination thereof. It is also contemplated that the UE 101 can support any type of interface to the user (such as "wearable" circuitry, etc.).

By way of example, the UE 101, service platform 107, and advertising platform 113 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

In one embodiment, the service platform 107 and/or advertising platform 113 may interact according to a client-server model with applications 103 and/or advertising engine 109. According to the client-server model, a client process sends a message including a request to a server process, and the server process responds by providing a service (e.g., messaging, advertisements, etc.). The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
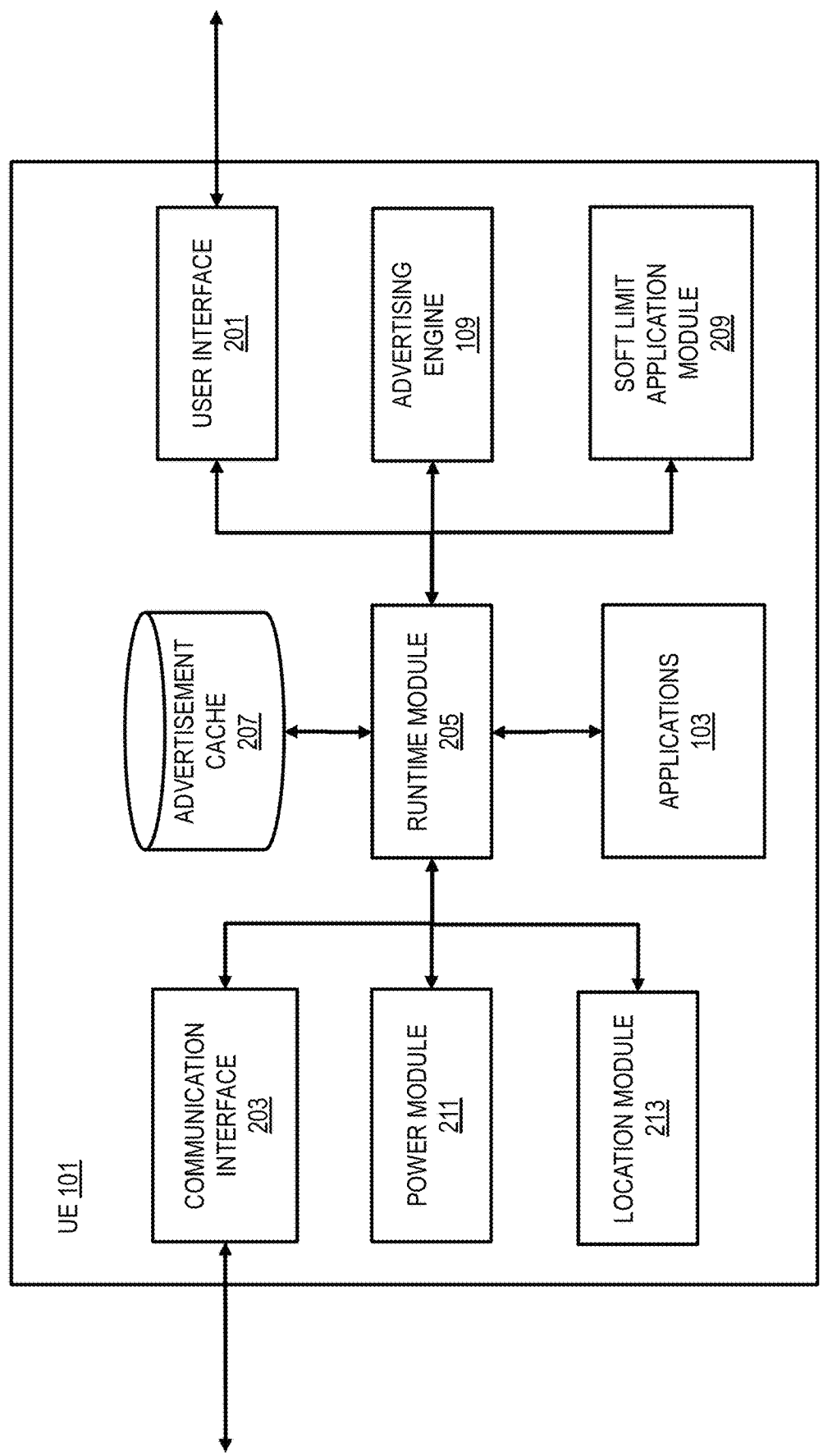
FIG. 2 is a diagram of the components of user equipment associated with presenting advertisements to a user, according to one embodiment.

FIG. 2 is a diagram of the components of user equipment associated with presenting advertisements to a user, according to one embodiment. By way of example, the UE 101 includes one or more components for caching advertisements to present to a user. It is contemplated that the functions of these components may be combined in one or more components or performed by other components of equivalent functionality. Additionally, the UE 101 and its components may be considered a means for completing some or all of the steps in the processes of FIGS. 4-6. In this embodiment, the UE 101 includes user interface 201 to receive input and provide output at the UE 101, a communication interface 203 to communicate over a network, runtime module 205 to control the execution of applications 103 and advertising engine 109 executing on the UE 101, an advertisement cache 207, a soft limit application module 209, a power module 211, and a location module 213.

The user interface 201 can include various methods of communication. For example, the user interface 201 can have outputs including a visual component (e.g., a screen), an audio component, a physical component (e.g., vibrations), and other methods of communication. User inputs can include a touch-screen interface, a scroll-and-click interface, a button interface, etc. In certain embodiments, the user interface 201 may additionally have a vocal user interface component. As such, a text-to-speech mechanism may be utilized to provide textual information to the user. Further, a speech-to-text mechanism may be utilized to receive vocal input and convert the vocal input into textual input. Moreover, the user interface 201 may be utilized to provide visual output of applications 103 and/or advertisements. As previously noted, the advertising engine 109 can control which advertisements are presented with which applications 103.

The communication interface 203 may include multiple means of communication. For example, the communication interface 203 may be able to communicate over SMS, MMS, internet protocol, instant messaging, voice sessions (e.g., via a phone network), or other types of communication protocols. The communication interface 203 can be used by the runtime module 205 to communicate with other UEs 101, the service platform 107, the advertising platform 113, and other devices. In some examples, the communication interface 203 is used to transmit and receive communication messages to obtain services from the service platform 107 and/or advertisement information from the advertising platform 113. In certain embodiments, advertising information includes advertisements, advertisement creatives, advertising categorization information (e.g., the advertisement is associated with a sponsor of an application 103, the advertisement is a house advertisement associated with the advertising platform 113, the type of item or service the advertisement is for, the type of user the advertisement is geared towards, etc.), soft limits, soft limit parameters, etc.

Further, the advertising engine 109 may utilize the communication interface 203 to update the advertisement cache 207. As such, the advertising engine 109 can utilize soft limits as parameters to determine when to update the advertisement cache 207. A soft limit application module 209 can be utilized to determine when a soft limit is met and notify the advertising engine 109 to contact the advertising platform 113 for additional advertising information. As previously noted, the soft limits can be set based on contextual information and/or other advertising information.

As noted, the UE 101 includes a power module 211. The power module 211 provides power to the UE 101. The power module 211 can include any type of power source (e.g., battery, plug-in, etc.). Additionally, the power module 211 can provide power to the components of the UE 101 including processors, memory, and transmitters. The power module 211 may further provide the runtime module 205 and/or advertising engine 109 with a status of the power supply (e.g., a battery status, such as battery low, a time left for the battery at current power consumption, a percentage of battery power left, etc.).

The location module 213 can determine a user's location. The user's location can be determined by a system such as a GPS, A-GPS, Cell of Origin, or other location extrapolation technologies. Standard GPS and A-GPS systems can use satellites to pinpoint the location of a UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module 213 may also utilize multiple technologies to detect the location of the UE 101. In certain embodiments, the location information is utilized as contextual information to determine soft limits by the advertising engine 109 and/or be utilized by the soft limit application module 209 for determining when a soft limit is met. Further, the location of the UE 101 can be sent to the advertising platform 113 to allow for contextual advertising. For example, when the UE 101 is nearby an advertisement campaign's sponsor, the advertising platform 113 may provide advertisements associated with that campaign.

Figure 3:
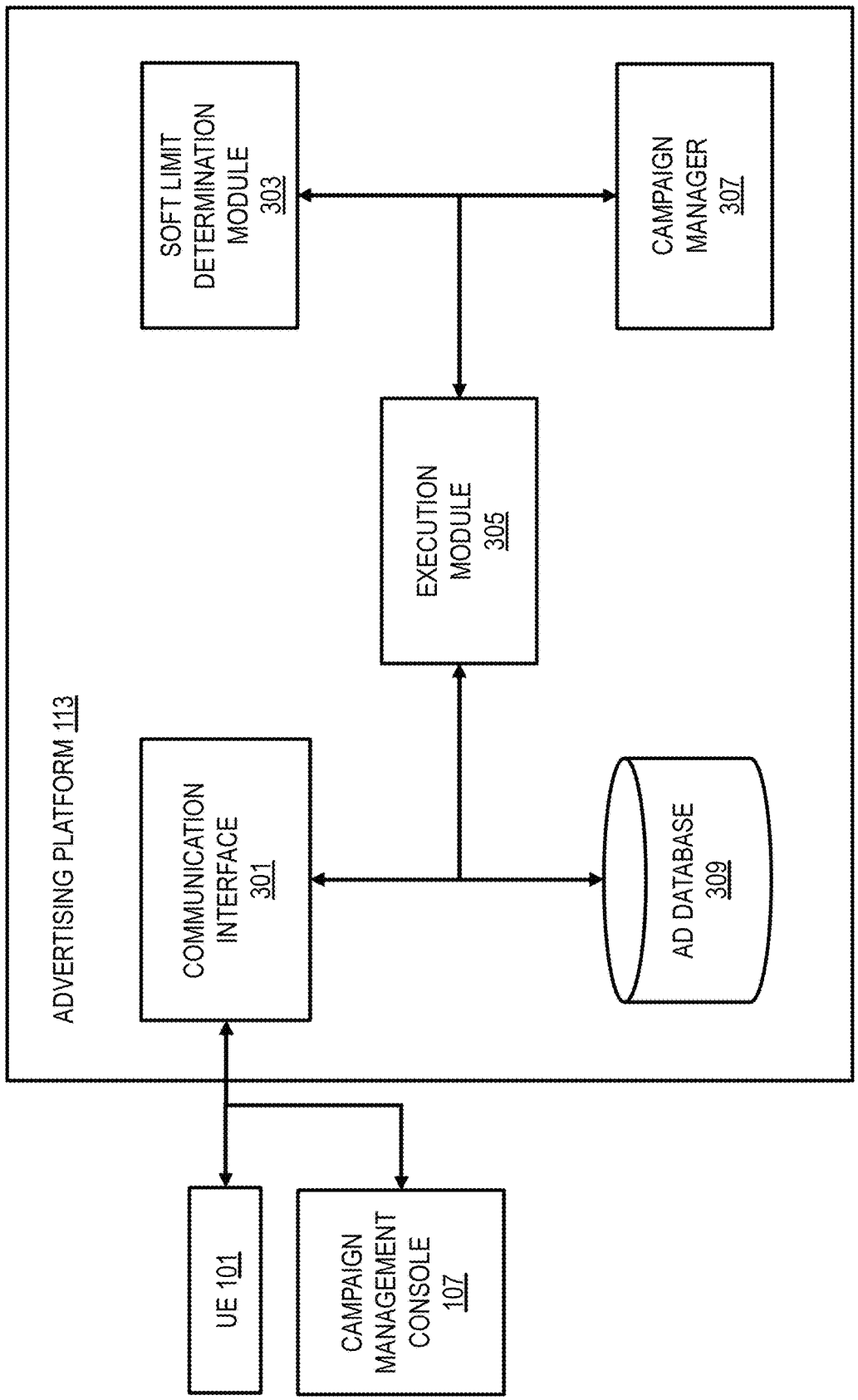
FIG. 3 is a diagram of the components of an advertising platform, according to one embodiment.

FIG. 3 is a diagram of the components of an advertising platform 113, according to one embodiment. By way of example, the advertising platform 113 includes one or more components for providing advertisement information to a UE 101. It is contemplated that the functions of these components may be combined in one or more components or performed by other components of equivalent functionality. In this embodiment, the advertising platform 113 includes a communication interface 301, a soft limit determination module 303 that can determine soft limits for UEs 101, an execution module 305 that can execute processes and interface between other modules, a campaign manager 307, and an ad database 309.

The communication interface 301 can be used to communicate with UEs 101, a campaign management console 115, and other device available over the communication network 105. The execution module 305 can receive information (e.g., a request for advertisements and/or soft limits) from the UE 101 via the communication interface 301 via methods such as internet protocol, Multimedia Messaging Service (MMS), Short Message Service (SMS), GPRS, or any other available communication method. Components in the communication network 105 and/or communication interface 301 may be utilized to convert one form of communication to another form (e.g., from an SMS to another form of data).

The campaign manager 307 can be utilized to receive communications from the campaign management console 115 and to obtain advertisement information. As such, an advertising user associated with one or more advertising campaigns may provide advertising creatives as well as parameters for when the advertising creatives should be presented. These advertising creatives can be stored in the ad database 309. In one example, the advertising creatives can be associated with parameters to show the advertisements based on certain demographic information. Further, the campaign manager 307 can receive information about soft limits the advertising user wishes to associate with particular advertising campaigns and/or advertisements. Moreover, the campaign manager 307 can implement distribution algorithms taking into account a large base of UEs 101 to provide advertisements to. The advertisements may be stored in the ad database 309. Further, the campaign manager 307 can selectively distribute advertisements to UEs 101 so that advertisements are not over delivered to the UE base. In this manner, the advertising platform 113 need not deliver the same advertisements to all UEs 101 and can thus control advertisement exposure using soft limits on the UEs 101 the campaign manager 307 determines to deliver the advertisements to. For example, distribution algorithms may include algorithms to maximize click-through-rates of individual UEs 101, algorithms to determine demographic information associated with the user of particular UEs 101 and target particular UEs 101, etc.

The campaign manager 307 can provide soft limit parameters to the soft limit determination module 303. The soft limit determination module 303 can determine soft limits to be associated with campaigns, advertisements, soft limits to generally apply based on categories, etc. In certain embodiments, the soft limit determination module 303 can be utilized to update or override current soft limit settings on a UE 101. Further soft limit determination parameters are detailed in the processes of FIG. 7. Moreover, the campaign manager 307 may be utilized to provide reports to managers of campaign advertisements. As such, statistical data about UEs 101 can be compiled for reporting how well the advertisement campaign has performed using one or more metrics and/or provide statistical data. The campaign manager 307 can obtain information about UE click-through-rates via the communication interface 301 from the UEs 101. The information may be sent with a request for additional advertisements.

Figure 4:
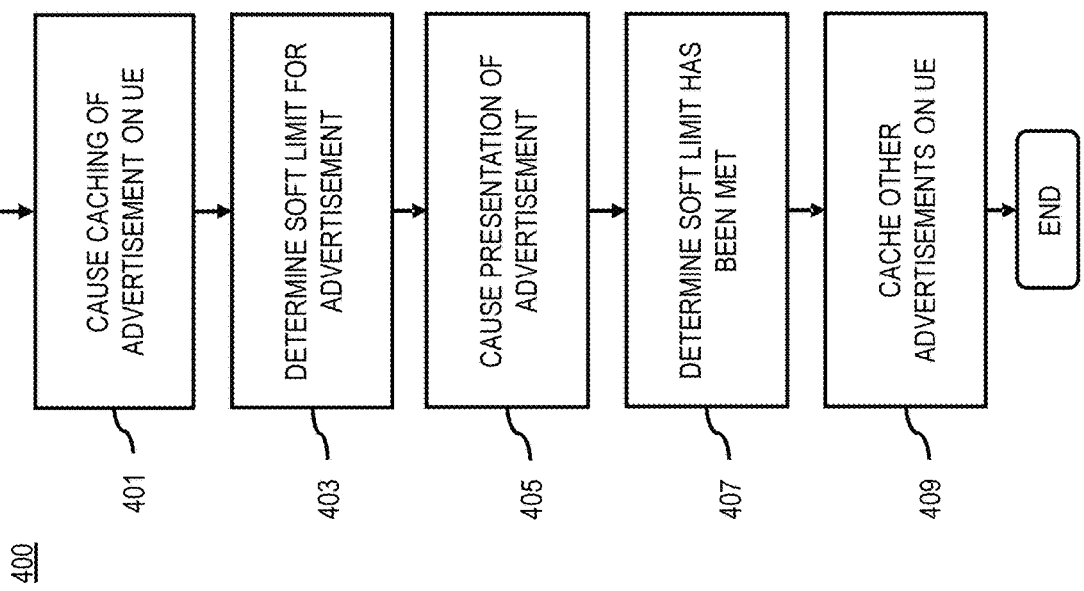
FIG. 4 is a flowchart of a process for caching advertisements on user equipment based on soft limits, according to one embodiment.

FIG. 4 is a flowchart of a process for caching advertisements on user equipment based on soft limits, according to one embodiment. In one embodiment, the advertising engine 109 of the UE 101 performs the process 400 and is implemented in, for instance, a chip set including a processor and a memory as shown FIG. 10. As such, the advertising engine 109 can provide means for accomplishing various parts of the process 400 as well as means for accomplishing other processes in conjunction with other components of the UE 101. In step 401, the advertising engine 109 causes, at least in part, caching of an advertisement at the UE 101. The caching of the advertisement can be based, at least in part, on a soft limit. Further, the advertisement in the cache can be associated with a soft limit for caching one or more other advertisements.

Next, at step 403, the advertising engine 109 determines a soft limit associated with the advertisement. In certain embodiments, the soft limit specifies when to cache one or more other advertisements. This may include determining when to request one or more other advertisements to be downloaded to the cache. When a soft limit is met, the other advertisements are acquired (e.g., via download). The advertising engine 109 can determine the soft limit by receiving the soft limit from an advertising platform 113 to guide the caching of ads. In other embodiments, the advertising engine 109 can determine the soft limits based on contextual information. One example of contextual information includes soft-limits for determining upcoming offline periods. A goal of utilizing soft limits is to have impressions of advertisements available to present to users of the UE 101 when the UE 101 is offline. As such, the advertising engine 109 can determine information about the UE 101 as to time periods when the UE 101 is without access to communicate with the advertising platform 113 (e.g., when the UE 101 is below ground, at work, etc.). Then, the advertising engine 109 or advertising platform 113 can determine soft limits in accordance to historical lack of access by the UE 101. For example, if the user is out of connection range between the times of 8 AM to 5 PM on Monday through Friday, soft limits can be utilized to acquire new advertisements before 8 AM. Further, other contextual information may be utilized to determine soft limits as further detailed in FIG. 5. Moreover, soft limits can be set as general (e.g., default) soft limits for each advertisement or based on categories as further detailed in FIG. 6. For example, a default soft limit may be set to be at 75% of the corresponding hard limit.

Moreover, the advertising engine 109 causes, at least in part, the presentation of the advertisements, the other advertisements, or a combination of the advertisements based, at least in part, on validity information associated with the advertisement (step 405). As noted above, in some embodiments, the validity information is a limit associated with whether or not the advertisement is valid to be presented. As such, the validity information may be set based on when the advertisement expires (e.g., based on a time or a number of impressions made to a user of the UE 101). The presentation of the advertisement(s) can be before the use of an application 103 (e.g., a full or partial screen presentation before the application 103 can be utilized), during the use of the application 103 (e.g., as a portion of a screen running the application 103 or as an advertisements that periodically is presented via the screen and/or via audio), or after the application content is presented (e.g., during shutdown of the application 103). As previously noted, in other embodiments, the advertisement may be presented as a system process of the UE 101 and need not be associated with the application 103. In certain embodiments, the advertising engine 109 causes the application 103 to present the advertisement by providing the advertisement (e.g., a location in the advertisement cache 207) and/or an instruction to present the advertisement. Thus, the advertising engine 109 can cause presentation of an advertisement by delivering an ad to an application 103 that request it, or initiating a "pop up" to an application 103 that supports this type of behavior. A "pop up" may be considered presented when the advertising engine 109 uses a push type API to present advertisements via the application 103. Further, an application 103 may be the idle screen of the UE 101, or a screen server. The pop up may be initiated by the advertising engine 109 according one or more contextual parameters such as time or location (e.g., when the UE 101 is at the user's home).

The advertising engine 109 determines that the soft limit has been met (step 407). As previously noted, the soft limit determination can be made according to one or more criteria associated with the soft limits. For example, the soft limits can have a criteria associated with contextual information, categories, parameters set by a campaign manager, etc. Accordingly, one or more soft limits may be triggered depending on the criteria associated with the soft limit. As such, different soft limits can be met depending on the circumstances or context associated with the UE 101, a user of the UE 101, the advertisement, the advertising platform 113, etc.

When the soft limit is met based on the criteria (e.g., time and/or impression limits based on context), the advertising engine 109 causes caching of the other advertisements on the UE 101 (step 409). The advertising engine 109 can cause transmission of a request for the advertisements from the advertising platform 113 and receive the advertisements. Further, the advertising engine 109 can determine or receive soft limit parameters associated with the advertisements and/or other information (e.g., categorical or campaign information) associated with the advertisements. As such, soft limits can be associated with the advertisement. Moreover, the advertisements and/or soft limits can be based on the click-through-rate of advertisements presented. This can be based on the individual user of the UE 101 and based on information gathered by the UE 101 and/or based on other information gathered by the advertising platform 113 from a device base of other UEs 101.

Figure 5:
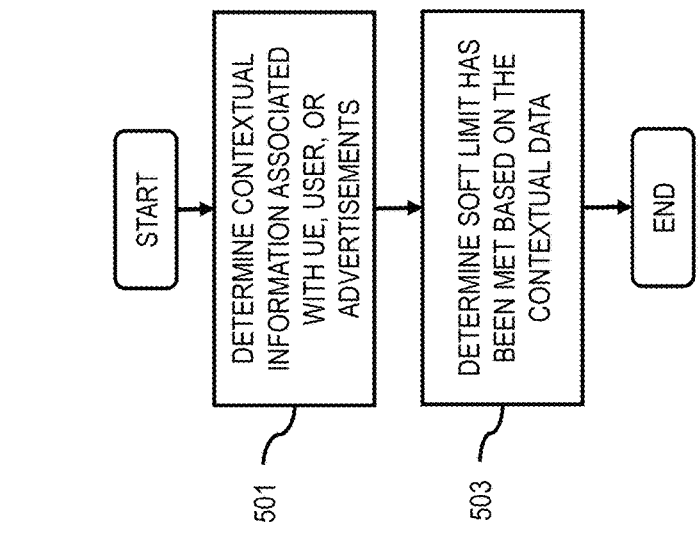
FIG. 5 is a flowchart of a process for determining soft limits based on contextual information, according to one embodiment.

FIG. 5 is a flowchart of a process for determining soft limits based on contextual information, according to one embodiment. In one embodiment, the advertising engine 109 of the UE 101 performs the process 500 and is implemented in, for instance, a chip set including a processor and a memory as shown FIG. 10. As such, the advertising engine 109 can provide means for accomplishing various parts of the process 500 as well as means for accomplishing other processes in conjunction with other components of the UE 101. In certain embodiments, portions of the process 500 can be executed using one or more components of the advertising platform 113.

At step 501, the advertising engine 109 determines contextual information associated with the UE 101, user of the UE 101, advertisements, or a combination thereof. In certain embodiments, the contextual information includes a roaming status of the UE 101, a type of radio technology utilized by the UE 101, a user's data plan, a battery status associated with the UE 101, a validity time associated with the advertisement and/or advertisement campaign, a fill rate associated with the advertisement, based on a click-through-rate associated with the user or other users, a distribution algorithm utilizing the soft limits to control advertisement exposure, advertiser input, time of day, location of UE 101, or a combination thereof. Then, the advertising engine 109 determines the soft limit based, at least in part, on the contextual data (step 503).

In one embodiment, the roaming status of the UE 101, is utilized to determine the soft limit. As such, a high soft limit can be set for when the UE 101 is abroad or roaming. A high soft limit can be determined to be a soft limit with a higher number of impressions that can be presented or a longer time limit before requesting additional advertisements, resulting in a lower frequency of acquiring additional advertisements. The lower frequency of acquiring additional advertisements can then advantageously result in reduced network bandwidth use. Likewise, when availability or cost of bandwidth is not a concern, a low soft limit can be set to lower the number of impressions or time limit to acquire additional advertisements, resulting in a higher frequency of acquiring additional advertisements. In certain embodiments, a roaming parameter can be associated with a dynamic soft limit. In this embodiment, the roaming parameter increases a base soft limit when the UE 101 is roaming.

In another embodiment, the type of communication technology (e.g., radio technology) utilized by the UE 101 is a parameter for setting the soft limit. For example, when the UE 101 is connected to a low power consumption communication technology, the soft limit can be lower. As such, because less power is needed to utilize the communication technology, the frequency of receiving additional advertisements can be increased. In one example, the UE 101 is a cellular phone and the types of communication technology used are cellular radio and wireless local area network. In this example, the soft limit can be lower for wireless local area network than for cellular radio. As noted above, the type of communication technology used can be a parameter in setting up a dynamic soft limit. Similarly, the user's data plan may be a basis for determining soft limits. For example, if the user has an unlimited data plan, the soft limit can be set lower without incurring additional costs to the user, while if the user has a limited data plan, the user may not wish to incur fees to receive advertisements.

In yet another embodiment, the battery status associated with the UE 101 is a parameter for setting the soft limit. As such, when the battery life indicator of the UE 101 is lower, the advertising engine 109 determines the higher soft limit for retrieving advertisements. Further, when the battery life indicator indicates a critically low battery life remaining (e.g., the battery is below a certain threshold level), the soft limit can be adjusted even higher (e.g., by setting parameters of a dynamic soft limit).

Further, in one embodiment, the validity time associated with the advertisement and/or advertisement campaign can be utilized to set a soft limit associated with the advertisement's useful life. For example, in an advertisement for a sale at a department store, the advertisement would be less useful after the sale was completed (e.g., at the end of the week). As such, the advertising engine 109 can set a soft limit parameter to determine to acquire additional advertisements in a time period before the advertisements lose usefulness.

Moreover, a fill rate associated with advertisements can be utilized to determine soft limits. A fill rate is the percentage of advertisements satisfied with an inventory of advertisements. For example, an inventory of advertisements can be a certain number based on how many advertisements an advertiser wishes to purchase from the advertising platform 113. If the fill rate is low, the soft limit can be high, allowing for the showing of the advertisement multiple times to users. A high soft limit provides less control for the advertising platform 113 and can increase the risk that a campaign is over delivered. However, this is an acceptable risk if the fill rate is low because there is a higher inventory of advertisements available.

Additionally or alternatively, the soft limit can be determined, based at least in part, on a click-through-rate associated with the user or other users. As such, the advertising engine 109 can determine a click-through-rate maximization algorithm. The goal of the algorithm is to maximize the number of times the user accesses the advertisements by setting the soft limit accordingly. For example, the advertising engine 109 determines a soft limit base. Then, the advertising engine 109 utilizes the algorithm to determine soft limits to maximize the click-through-rate based on the historical click-through-rates associated with the UE 101 and/or user. Moreover, in certain embodiments, click-through-rate information is provided to the advertising platform 113 and the advertising platform 113 can utilize algorithms to maximize the click-through-rate of a base of users via a distribution algorithm utilizing soft limits to control advertisement exposure (e.g., based on the click-through-rates).

In certain embodiments, advertiser input can be utilized to determine soft limits. For example, the advertiser (e.g., advertisement publisher, agent, etc.) may set a lower boundary soft limit parameter. This parameter may set a boundary for the lowest soft limit available for the advertising engine 109 to utilize. This may be set so that the advertisement is shown at least a certain amount of times before newer advertisements are acquired. This can be useful if an optimal click-through-rate is determined to be after a certain number of impressions.

Moreover, the time of day and/or location of the UE 101 may be utilized to determine soft limits. For example, it may be beneficial to update advertisements during daytime hours and/or when the UE 101 is plugged in and not on a battery supply. Further, it may be beneficial to update soft limits when the UE 101 moves from one location to another. For example, soft limits may be higher when the user is at a work place and lower when the user is at a mall. Further, advertisements can be based on the location of the UE 101. The advertising engine 109 can retrieve location coordinates from the location module 213 and can send the location coordinates to the advertising platform 113 to retrieve advertisements associated with the location. For example, if the user is in a location associated with a mall, more frequent updates may be utilized and/or advertisements for store merchandise may be provided to the UE 101.

With this approach, the soft limits may be set by the advertising platform 113 and/or the advertising engine 109. Further, multiple parameters associated with soft limits can be received by the advertising engine 109 from the advertising platform 113 to determine the soft limit and/or determining that the soft limit has been met. As such, the parameters may be criteria used to determine whether the soft limit has been met.

FIG. 6 is a flowchart of a process for determining soft limits based on categories, according to one embodiment. In one embodiment, the advertising engine 109 of the UE 101 performs the process 600 and is implemented in, for instance, a chip set including a processor and a memory as shown FIG. 10. As such, the advertising engine 109 can provide means for accomplishing various parts of the process 600 as well as means for accomplishing other processes in conjunction with other components of the UE 101. In certain embodiments, portions of the process 600 can be executed using one or more components of the advertising platform 113.

At step 601, the advertising engine 109 and/or execution module 305 categorizes advertisements according to predetermined criteria. In certain embodiments, the criteria are set by the advertising platform 113. Criteria to determine categories can include a type of advertisement (e.g., audio, video, image, etc.), an advertising campaign or flight associated with the advertisement, a class of advertisement (e.g., sponsorship advertisement, guaranteed advertisements, remnant advertisements (e.g., remainder or last minute advertising space that the service provider has been unable to sell), house advertisement (e.g., advertisements generated by the service provider)), etc.). Categories can allow the advertising platform 113 and/or a campaign manager to modify or otherwise determine soft limits based on the categories (step 603). Thus, changes can be made at a large scale level on many different advertisements. Further, soft limit parameters may be different for different categories of advertisements due to priorities.

The class of advertisements can be utilized to determine a preference for using the advertisements to present on the UE 101. For example, sponsorship advertisements and guaranteed advertisements may generate greater revenues for the advertising platform 113, thus, soft limits associated with these advertisements may be higher. A sponsorship advertisement may be an advertisement where a particular sponsor buys a large amount of advertising space on one or more UEs 101 and/or applications 103 to repeatedly publish advertisements associated with the sponsor. Remnant advertising space can be priced at a lower cost to advertisers; therefore, it may be beneficial for the advertising service to utilize a lower soft limit for the remnant advertisements to increase revenue. Further, house advertisements may not generate any revenue, but rather generate good will towards the service. Thus, the service provider may wish to utilize low soft limits to decrease the chance of publishing house advertisements in favor of paid advertisements. Additionally, in certain embodiments, default soft limit parameters can be set for different categories of advertisements. These soft limit parameters may be overridden (e.g., if an advertisement is received from the advertising platform 113 with its own parameters).

FIG. 7 is a flowchart of a process for determining soft limits based on advertiser criteria, according to one embodiment. In one embodiment, the execution module 305 of the advertising platform 113 performs the process 700 and is implemented in, for instance, a chip set including a processor and a memory as shown FIG. 10. As such, the execution module 305 can provide means for accomplishing various parts of the process 700 as well as means for accomplishing other processes in conjunction with other components of the advertising platform 113. In certain embodiments, portions of the process 700 can be executed using one or more components of the UE 101.

At step 701, the execution module 305 associates the advertising engine 109 of the UE 101 with the advertising platform 113. This may be done by associating an identifier (e.g., phone number, unique identifier, username and/or password, pin code, etc.) with the UE 101 and/or user. Further, multiple UEs 101 comprising a device base can be associated with the advertising platform 113. Further, the execution module 305 can characterize the device base associated with the UEs 101 (step 703). This characterization can be based, at least in part, on demographic information associated with the users of the UEs 101 and/or UE 101 use information.

Then, at step 705, input associated with advertiser criteria for soft limits is received. The criteria can include soft limits minimums and/or maximums. For example, a maximum limit on impressions may be set if the advertiser does not want more than a certain number of impressions of an advertisement creative to be shown to a user. Further, as noted above, the advertiser can adjust soft limits based on categories via the campaign manager 307.

At step 707, the execution module 305 can determine soft limits for a particular advertising engine 109 of a UE 101. As such, the execution module 305 determines which advertisements to provide to the UE 101 based on distribution algorithms. The distribution algorithms may be based, at least in part, on how many UEs 101 have been targeted for a particular advertisement flight or campaign. The soft limits on the UE 101 may be set so that as a whole, the advertisement campaign is not over delivered. An advertisement campaign can be over delivered if the number of impressions of the advertisements is more than the number of impressions sold to a customer. This may mean that revenue is not generated by the over delivered advertisements. Thus, the advertising service provider, to maximize revenue, may set the soft limits so that chance to over deliver the advertisement campaign is reduced (e.g., by limiting the number of high soft limits to a certain number of UEs 101). Once a soft limit is determined, the soft limit is caused, at least in part, to be transmitted to the advertising engine 109 (step 709). The transmission can be included with a particular advertising creative associated with the advertisement.

Figure 8B:
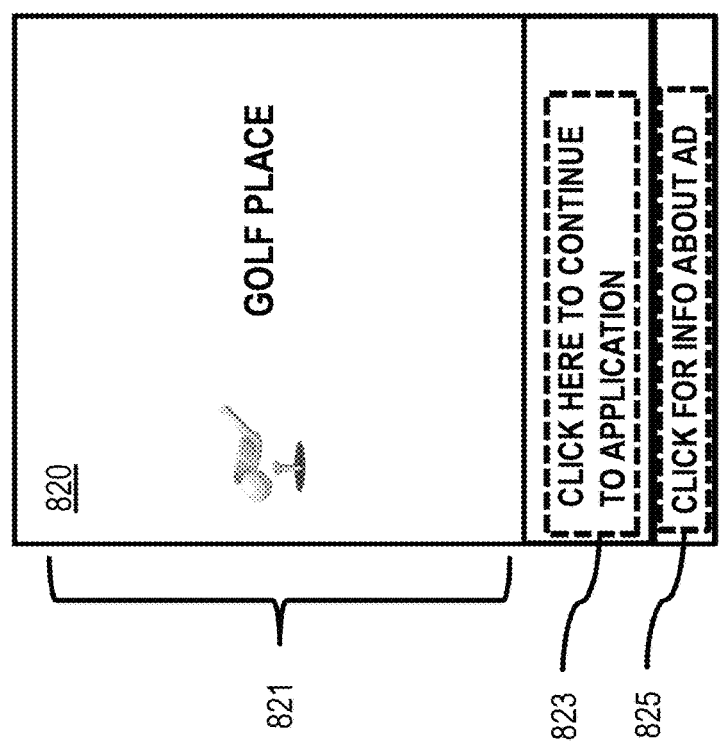
FIGS. 8A-8B are diagrams of example user interfaces utilized in the processes of FIGS. 4-7, according to various embodiments.
Figure 8A:
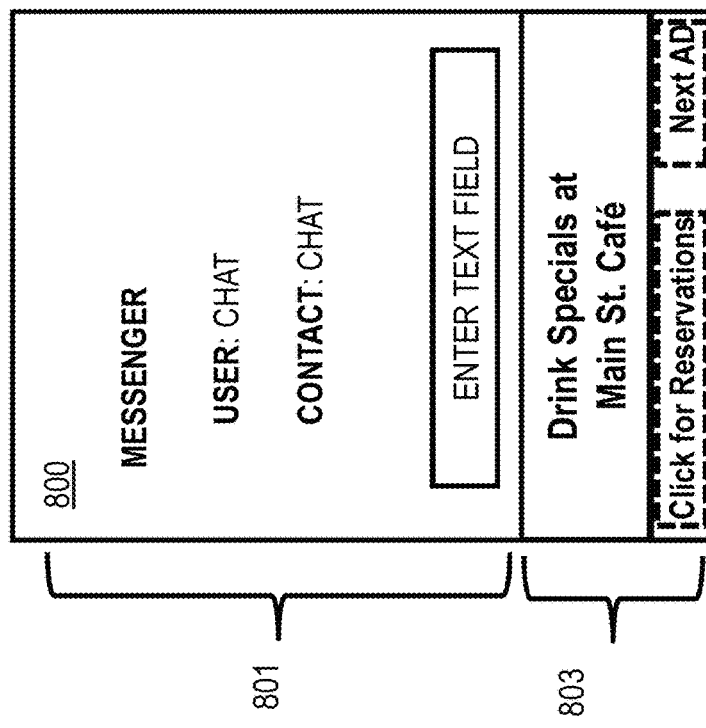

FIGS. 8A-8B are diagrams of example user interfaces utilized in the processes of FIGS. 4-7, according to various embodiments. FIG. 8A shows a user interface 800 with an advertisement displayed during the execution of a messaging application. Application content 801 is presented at the same time as advertisement content 803. Further, the user may click on a portion 805 of the advertisement to access additional content (e.g., make reservations). The advertisement content can be determined via soft limits.

Further, FIG. 8B shows a user interface 820 with advertisement content 821 displayed separately from application content. As such, the user may choose to continue to the application 823 and/or wait for a given amount of time to continue to the application. Further, the user can click for more information 825 about the advertiser. When clicked, information about the click can be stored in a memory and returned to an advertising platform 113 as statistical data.

With the above approaches, advertisements can be provided to a consumer during advantageous time periods based on soft limits. The advertisements can thus be provided to maximize use of a UE 101. For example, a soft limit based, at least in part, on the battery life of the UE 101 can be utilized to conserve battery power for the UE 101 when the UE 101 is low on battery power. Further, to conserve power, the UE 101 may have lower soft limits when the UE 101 is within range of communications technology that conserves power. Moreover, service provider and/or user costs can be saved by limiting retrieval of advertisements when the UE 101 is roaming out of service of the UE service provider.

The processes described herein for providing advertisements according to soft limits are disclosed may be advantageously implemented via software, hardware, firmware or a combination of software and/or firmware and/or hardware. For example, the processes described herein, including for providing user interface navigation information associated with the availability of services, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 9:
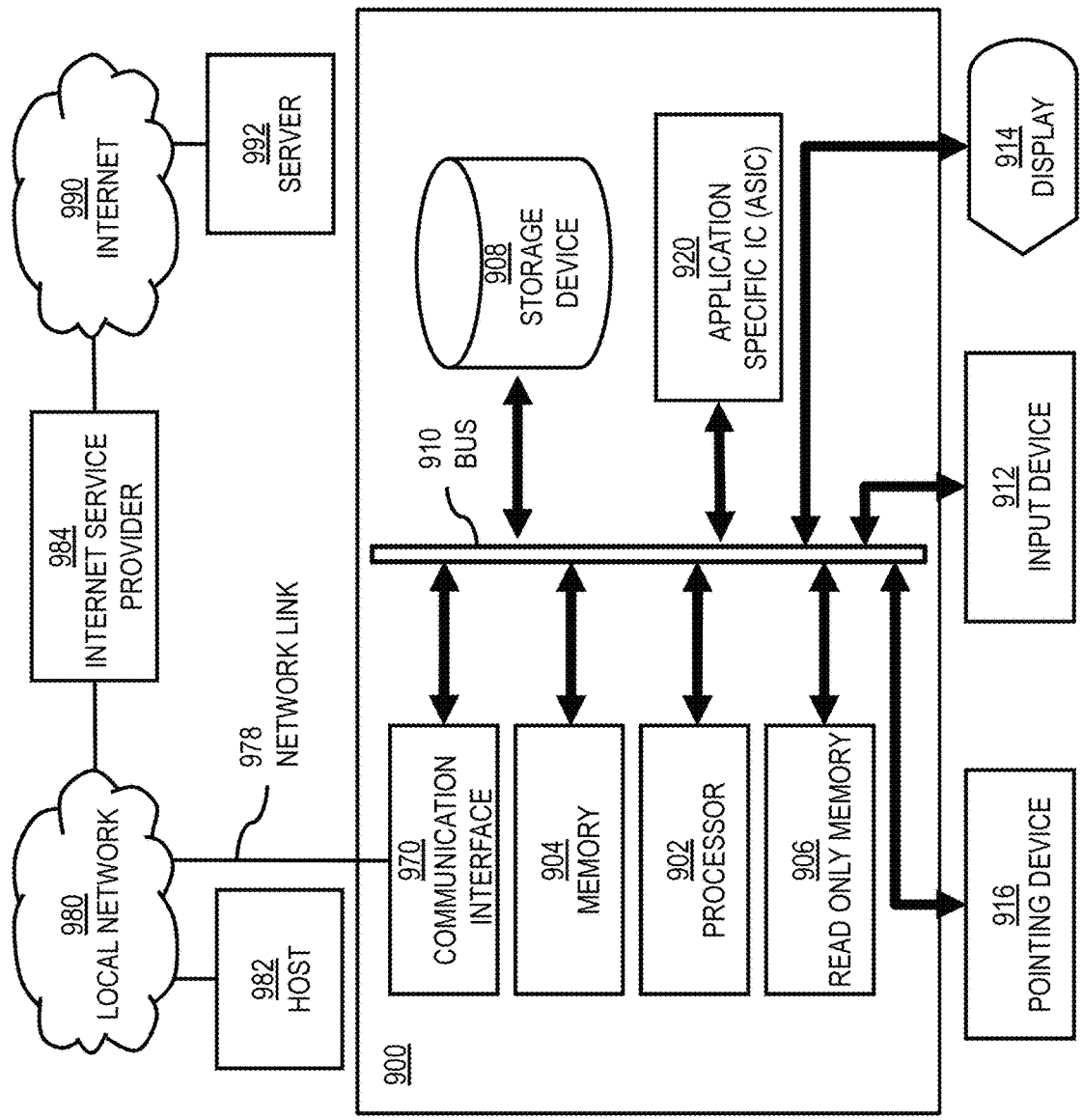
FIG. 9 is a diagram of hardware that can be used to implement an embodiment of the invention.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to serve advertisements according to soft limits are disclosed as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of serving advertisements according to soft limits are disclosed.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to serve advertisements according to soft limits are disclosed. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or other dynamic storage device, stores information including processor instructions for serving advertisements according to soft limits are disclosed. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for serving advertisements according to soft limits are disclosed, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 105 for serving advertisements according to soft limits are disclosed to the UE 101.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

Figure 10:
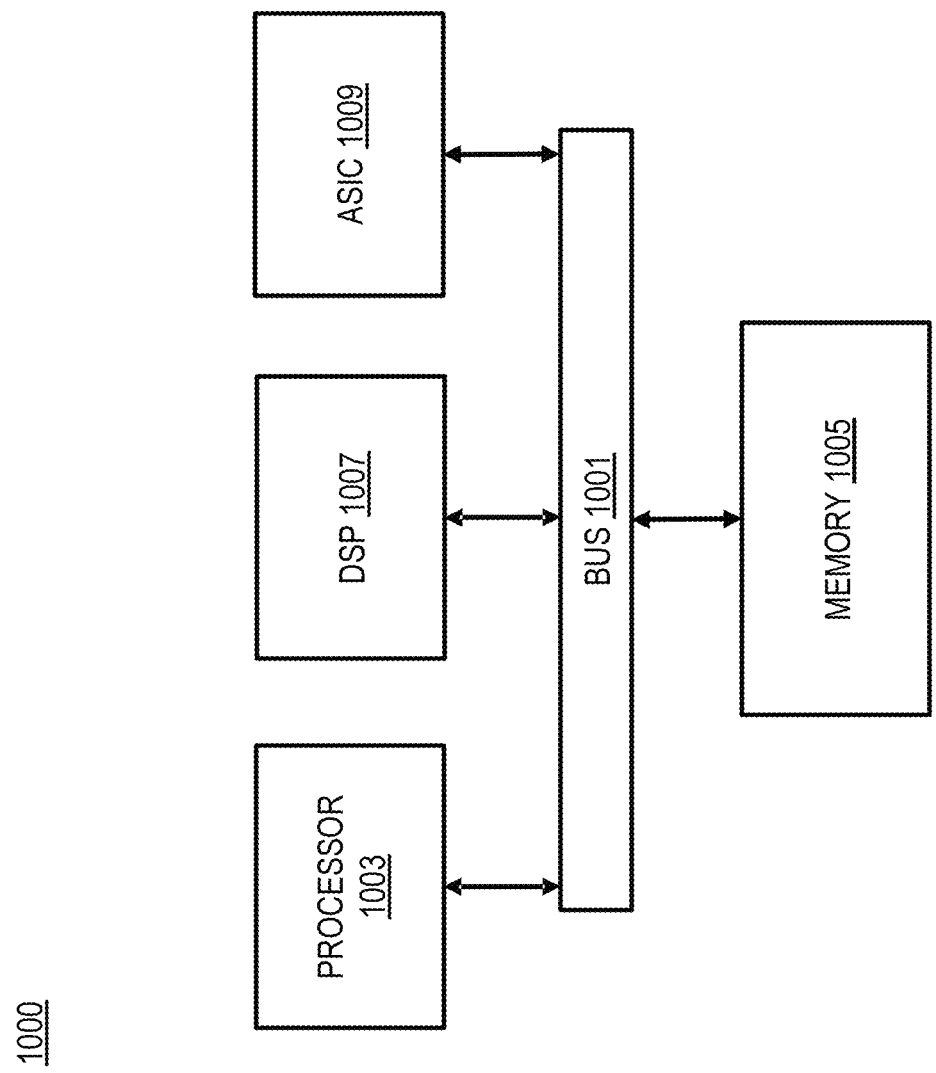
FIG. 10 is a diagram of a chip set that can be used to implement an embodiment of the invention.

FIG. 10 illustrates a chip set or chip 1000 upon which an embodiment of the invention may be implemented. Chip set 1000 is programmed to serve advertisements according to soft limits are disclosed as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of services. Chip set or chip 1000, or a portion thereof, constitutes a means for performing one or more steps of serving advertisements according to soft limits are disclosed.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 800 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to serve advertisements according to soft limits are disclosed. The memory 1005 also stores the data associated with or generated by the execution of the inventive steps.

Figure 11:
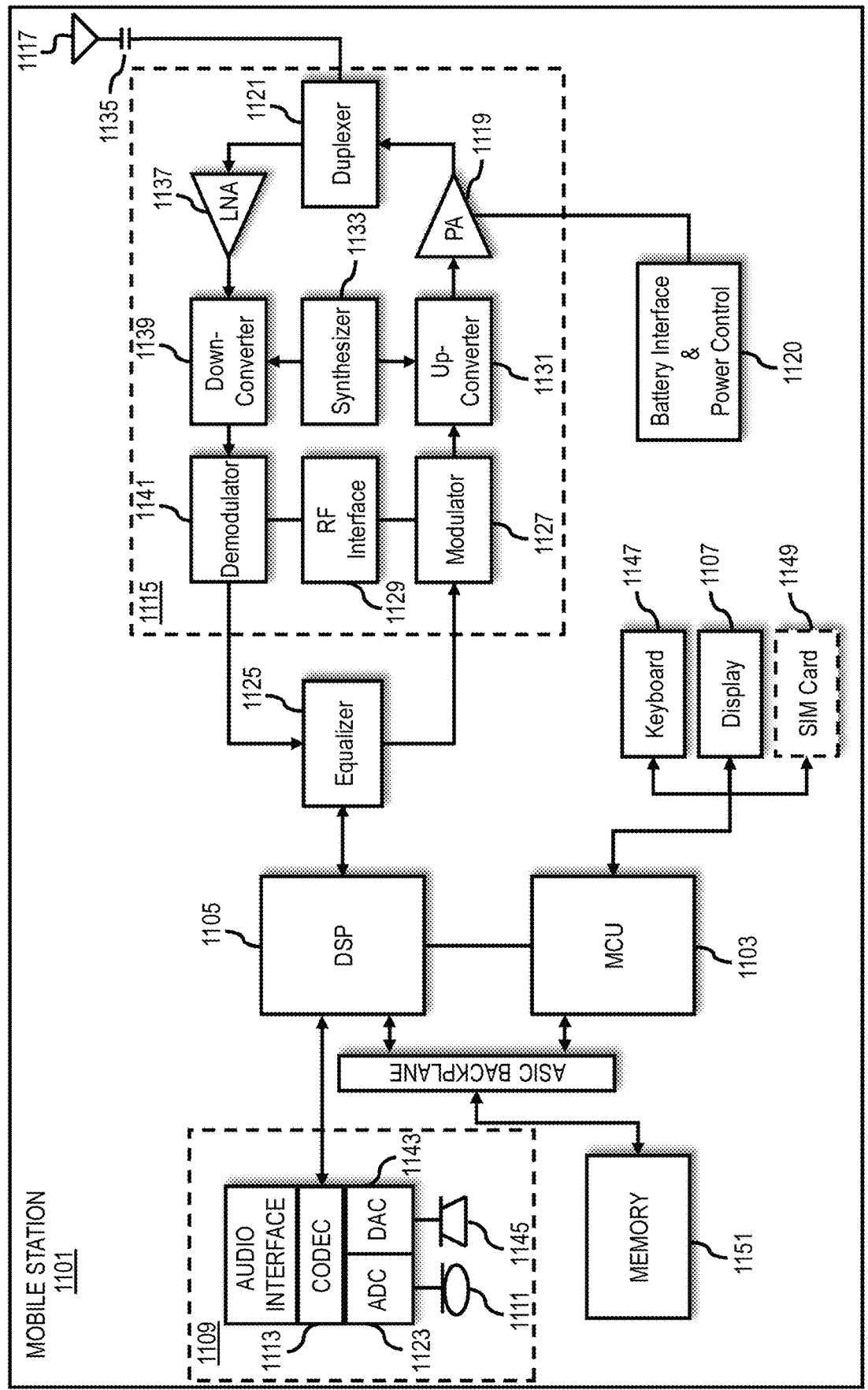
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1100, or a portion thereof, constitutes a means for performing one or more steps of serving advertisements according to soft limits are disclosed. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of serving advertisements according to soft limits are disclosed. The display 11 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to serve advertisements according to soft limits are disclosed. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for caching advertisement data at a mobile device based on a soft limit comprising:
    caching the advertisement data in a memory of a mobile device, wherein the advertisement data is associated with a hard limit that determines an expiration of the advertisement data;
    determining a battery status of the mobile device, a communication technology to be used by the mobile device, or a combination thereof;
    determining a soft limit for the advertisement data based on the battery status, the communication technology, or a combination thereof, wherein the soft limit is further based on whether a user of the mobile device has responded to one or more advertisements associated with the advertisement data and triggers when the mobile device begins to fetch, cache, or a combination thereof additional advertisement data to the memory;
    during a period of time between the soft limit and the hard limit, transmitting a request for the additional advertisement data over a communication network; and
    serving advertisements on a user interface of the mobile device on-line and off-line based on the soft limit and the hard limit.

2. The method of claim 1, further comprising:
determining at least one upcoming offline period of the mobile device; and
serving advertisements on the user interface during the at least one upcoming offline period,
wherein the soft limit is determined by adjusting the soft limit to be higher based on determining that the battery status indicates a battery of the mobile device is below a threshold level.

3. The method of claim 1, wherein the soft limit is determined by adjusting the soft limit to be lower based on determining that the communication technology is low power consumption communication technology.

4. The method of claim 3, wherein the low power consumption communication technology is a wireless local area network technology.

5. The method of claim 1, wherein the soft limit is determined by adjusting the soft limit to be higher based on determining that the communication technology is a cellular radio technology.

6. The method of claim 1, wherein the user has responded to the one or more advertisements by making one or more reservations.

7. The method of claim 1, wherein the soft limit is further based on a data plan associated with the communication technology, a roaming status of the mobile device, or a combination thereof.

8. The method of claim 1, wherein the soft limit is further based on a historical lack of access by the mobile device.

9. The method of claim 8, wherein the historical lack of access is based on an out of connection range.

10. The method of claim 1, further comprising:
mixing between presenting the advertisement data and the additional advertisement data during the period of time between the soft limit and the hard limit,
wherein the soft limit is further based on availability of an advertised product or service.

11. The method of claim 10, wherein the soft limit is further based on a fill rate, and the fill rate is a percentage of advertisements satisfied per an inventory of advertisements.

12. The method of claim 10, wherein the soft limit is further based on a distribution algorithm, and the distribution algorithm selectively distributes advertisements to a plurality of mobile devices to prevent over delivery of advertisements.

13. An apparatus for caching advertisement data at a mobile device based on a soft limit comprising:
at least one processor; and
at least one memory including computer program code,
the at least one memory and the computer program code configured to, with the at least one processor, cause the apparatus to perform at least the following,
cache the advertisement data in a memory of a mobile device, wherein the advertisement data is associated with a hard limit that determines an expiration of the advertisement data;
determine a battery status of the mobile device, a communication technology to be used by the mobile device, or a combination thereof;
determine a soft limit for the advertisement data based on the battery status, the communication technology, or a combination thereof, wherein the soft limit is further based on whether a user of the mobile device has responded to one or more advertisements associated with the advertisement data and triggers when the mobile device begins to fetch, cache, or a combination thereof additional advertisement data to the memory;
during a period of time between the soft limit and the hard limit, transmit a request for the additional advertisement data over a communication network; and
serve advertisements on a user interface of the mobile device on-line and off-line based on the soft limit and the hard limit.

14. The apparatus of claim 13, wherein the soft limit is determined by adjusting the soft limit to be higher based on determining that the battery status indicates a battery of the mobile device is below a threshold level.

15. The apparatus of claim 13, wherein the soft limit is determined by adjusting the soft limit to be lower based on determining that the communication technology is low power consumption communication technology.

16. The apparatus of claim 15, wherein the low power consumption communication technology is a wireless local area network technology.

17. The apparatus of claim 13, wherein the soft limit is determined by adjusting the soft limit to be higher based on determining that the communication technology is a cellular radio technology.

18. A non-transitory computer-readable storage medium for caching advertisement data at a mobile device based on a soft limit, carrying one or more sequences of one or more instructions which, when executed by one or more processors, cause an apparatus to at least perform the following steps:
caching the advertisement data in a memory of a mobile device, wherein the advertisement data is associated with a hard limit that determines an expiration of the advertisement data;
determining a battery status of the mobile device, a communication technology to be used by the mobile device, or a combination thereof;
determining a soft limit for the advertisement data based on the battery status, the communication technology, or a combination thereof, wherein the soft limit is further based on whether a user of the mobile device has responded to one or more advertisements associated with the advertisement data and triggers when the mobile device begins to fetch, cache, or a combination thereof additional advertisement data to the memory; and
during a period of time between the soft limit and the hard limit, transmitting a request for the additional advertisement data over a communication network; and
serving advertisements on a user interface of the mobile device on-line and off-line based on the soft limit and the hard limit.

19. The non-transitory computer-readable storage medium of claim 18, wherein the soft limit is determined by adjusting the soft limit to be higher based on determining that the battery status indicates a battery of the mobile device is below a threshold level.

20. The non-transitory computer-readable storage medium of claim 18, wherein the soft limit is determined by adjusting the soft limit to be lower based on determining that the communication technology is low power consumption communication technology.

* * * * *